Oct. 20, 1925.
F. J. BUDROE ET AL
1,557,920
SICKLE SCABBARD
Filed Feb. 27, 1923
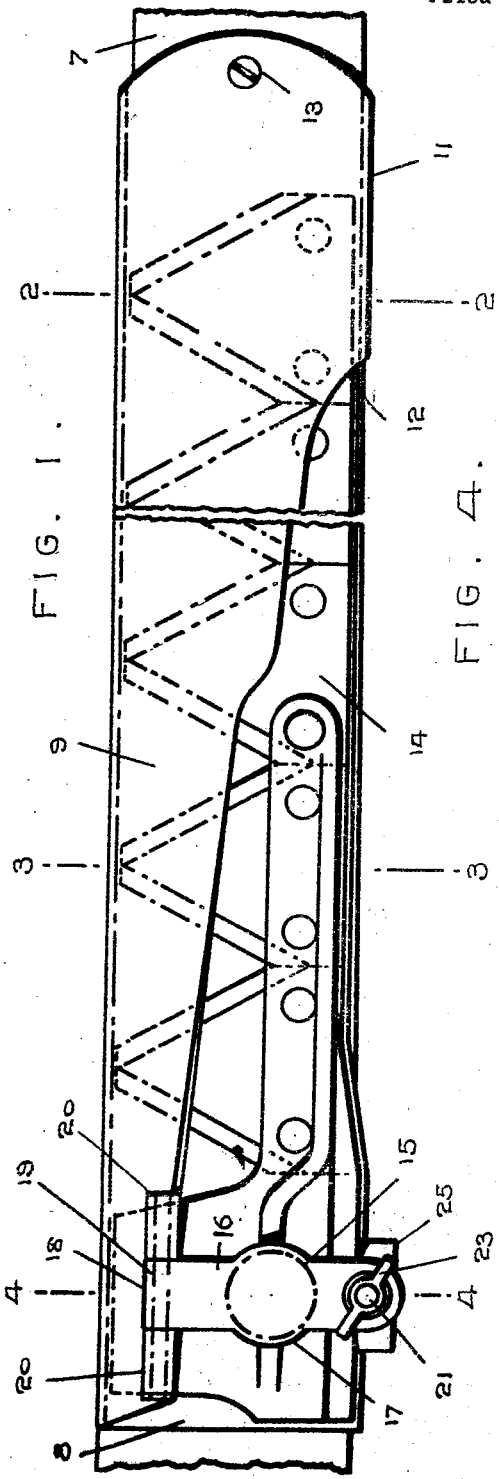
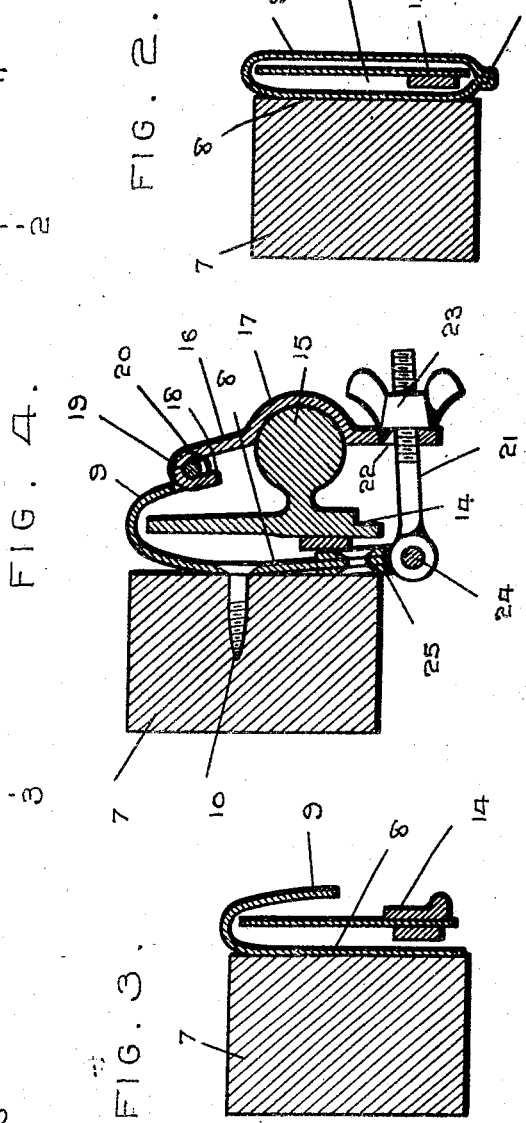
Inventors:
F. J. BUDROE,
AND J. J. McCORMICK, JR.,
By W. J. FitzGerald & Co.
Attorney.

Patented Oct. 20, 1925.

1,557,920

UNITED STATES PATENT OFFICE.

FRANCIS J. BUDROE AND JOHN J. McCORMICK, JR., OF UVA, WYOMING.

SICKLE SCABBARD.

Application filed February 27, 1923. Serial No. 621,580.

*To all whom it may concern:*

Be it known that we, FRANCIS J. BUDROE and JOHN J. McCORMICK, Jr., citizens of the United States, residing at Uva, in the county of Platte and State of Wyoming, have invented certain new and useful Improvements in Sickle Scabbards; and we do hereby declare the following to be a full, clear, and exact description of the invention, such as will enable others skilled in the art to which it appertains to make and use the same.

The present invention relates to a sickle scabbard for use on a mowing machine, and aims to provide a device for carrying and protecting an extra mowing machine sickle for use when the sickle that is being used becomes broken or dull.

It is the object of the invention to provide a simple and novel scabbard for holding and shielding an extra mowing machine sickle, and enabling such sickle to be conveniently carried on the machine, without the liability of injury to or by the sickle.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of the device, portions being broken away.

Figs. 2, 3 and 4 are cross sections on the respective lines 2—2, 3—3 and 4—4 of Fig. 1.

The scabbard is conveniently applied to the tongue 7 of the mowing machine, preferably at the top thereof, and is composed of sheet metal. The scabbard has the inner or bottom wall 8 and the outer overhanging or top wall 9, with their edges united at one edge of the scabbard, said walls being formed from an elongated sheet metal blank which is doubled on a longitudinal line, with the bend at one side. The wall 8 is secured to the top of the tongue 7 by means of one or more screws 10, or other fastening devices, and at its forward end the wall 9 is of the same width as the wall 8, the edges of said walls opposite the bend being beaded or otherwise secured together at the forward end, as at 11, to form a pocket 12. The wall 9 decreases in width from the pocket 12 to the rear end of the scabbard, and the forward end of the scabbard is secured to the tongue 7 by means of a screw 13 or other fastening element.

The scabbard is adapted to receive the mowing machine sickle 14 by moving the sickle laterally or edge-wise between the walls of the scabbard, with the cutting edges or blades under the wall 9, so as to be shielded, and the sickle is slid longitudinally forward to move the outer end of the sickle into the pocket 12, thereby supporting the outer or forward end of the sickle. The scabbard being disposed over the cutting edges or blades of the sickle, will prevent injury to the blades, and will also prevent the sickle from injuring or interfering with the harness of the draft animals. The scabbard is open at its rear end and one edge to receive the sickle, and is of sufficient length to accommodate the sickle, and scabbards of different lengths can be used for sickles of various lengths.

Clamping or securing means is provided for holding the inner or rear end of the sickle and for preventing the sickle from sliding rearwardly out of the pocket 12, such means being shown as adapted to engage the ball 15 with which the sickle is provided at its inner end, which is a part of the universal or ball and socket joint for the connection of the sickle operating means. A hasp or holding member 16 is hinged to the edge of the wall 9 of the scabbard at the rear end thereof, and has a recessed or socket portion 17 to fit over the ball 15 of the sickle when said hasp is swung downwardly across said ball. The hinge connection between the hasp and scabbard, as shown comprises a hook or loop 18 on one end of the hasp engaging a hinge pin 19 having its terminals disposed in hinge butts 20 with which the edge of the wall 9 is formed.

A bolt 21 is hinged to the edge of the wall 8 at the rear end thereof, to pass through an aperture 22 provided in the hasp near the free end of said hasp, and a nut 23 is threaded on said bolt to bear against the hasp for clamping the hasp against the sickle and thereby clamping the sickle against the inner wall 8 of the scabbard. This will also prevent the sickle from shifting or sliding lengthwise, as well as holding the inner or rear end of the sickle, while the outer or forward end is held in the pocket 12. As shown, the bolt 21 has an eye embracing a hinge pin 24 that is secured in a double sheet metal hinge butt 25 that is rivetted or otherwise secured to the edge portion of the wall 8.

When it is desired to remove the sickle to replace the sickle that is in use on the machine, such as when the lastnamed sickle is broken, injured or dulled, the nut 23 is removed and the hasp 16 swung upwardly, thereby permitting the sickle to be slid rearwardly slightly out of the pocket 12 and then edgewise or laterally out of the scabbard. The injured or dulled sickle can then be inserted in the scabbard and fastened.

Having thus described the invention, what is claimed as new is:—

1. A sickle scabbard of elongated form composed of opposite sides one of which is adapted to be secured to the tongue or similar supporting member of a mowing machine, said scabbard having a longitudinal opening at one edge extending from one end to a distance short of the opposite end, so as to form a pocket at the lastnamed end of the scabbard, whereby a mowing machine sickle can be inserted edgewise into the scabbard and moved lengthwise to position one end of the sickle in said pocket, and means carried by the scabbard near the firstnamed end to extend across said opening for securing the sickle in the scabbard having a portion formed to fit and accommodate a portion of the sickle for holding the sickle against both lengthwise and edgewise displacement in the scabbard.

2. A sickle scabbard of elongated form composed of opposite sides one of which is adapted to be secured to the tongue or similar supporting member of a mowing machine, said scabbard being open at one edge from one end to a distance short of the opposite end, so as to form a pocket at the lastnamed end of the scabbard, whereby a mowing machine sickle can be inserted edgewise into the scabbard and moved lengthwise to position one end of the sickle in said pocket, and means carried by the scabbard near the first named end for securing the sickle in the scabbard and including a portion formed to fit and accommodate a portion of the sickle.

3. A scabbard of elongated form having a longitudinal opening for the insertion of a member into the scabbard, a hasp and a bolt hingedly connected with said scabbard at opposite edges of said opening, said hasp being formed to engage the member when inserted in the scabbard and having an aperture to receive said bolt, and means on the bolt for clamping the hasp against said member.

In testimony whereof we have signed our names to this specification.

FRANCIS J. BUDROE.
JOHN J. McCORMICK, Jr.